United States Patent [19]

Nelsen et al.

[11] Patent Number: 4,503,619
[45] Date of Patent: Mar. 12, 1985

[54] INJECTOR HEIGHT MEASURING TOOL ASSEMBLY

[75] Inventors: Richard C. Nelsen, Franksville; Alfred A. Wridt, Racine; John E. Fuhreck, Kenosha, all of Wis.

[73] Assignee: Snap-on Tools Corporation, Kenosha, Wis.

[21] Appl. No.: 506,810

[22] Filed: Jun. 22, 1983

[51] Int. Cl.³ .................. G01B 5/14; G01M 15/00
[52] U.S. Cl. ........................ 33/181 AT; 33/180 AT; 33/DIG. 5; 33/169 B; 73/119 A
[58] Field of Search .... 33/181 AT, 180 AT, DIG. 5, 33/169 B, 172 R; 73/119 A

[56] References Cited

U.S. PATENT DOCUMENTS

| | | | |
|---|---|---|---|
| 1,888,454 | 11/1932 | Edson | 33/180 AT |
| 2,058,937 | 10/1936 | Zimmer | 33/181 AT |
| 2,471,746 | 5/1949 | Hilbert | 33/181 AT |
| 2,474,294 | 6/1949 | Weeks | 33/181 AT |
| 2,642,047 | 6/1953 | Johnson | 33/181 AT |
| 2,662,298 | 12/1953 | Cole | 33/180 AT |
| 2,776,494 | 1/1957 | Sheppard | 33/181 AT |
| 2,819,534 | 1/1958 | Kitzman | 33/181 AT |
| 2,827,710 | 3/1958 | Cambell | 33/180 AT |
| 2,835,044 | 5/1958 | Haunert | 33/181 AT |
| 2,855,692 | 10/1958 | Campbell | 33/181 AT |
| 3,744,142 | 7/1973 | Marshall | 33/181 AT |
| 3,765,098 | 10/1973 | Schafer | 33/180 AT |
| 4,098,233 | 7/1978 | Boyd | 73/119 A |
| 4,202,207 | 5/1980 | Johnson et al. | 73/119 A |
| 4,362,050 | 12/1982 | Stumpp et al. | 73/119 A |
| 4,420,973 | 12/1983 | Garcia | 73/119 A |

OTHER PUBLICATIONS

Four Photographs of Kent-Moore Device.

*Primary Examiner*—Willis Little
*Attorney, Agent, or Firm*—Emrich & Dithmar

[57] ABSTRACT

The injector height measuring tool assembly includes a tool having a magnetic member to which is attached a dial gauge having a plunger. The member is placed on the follower injector body and magnetically adheres thereto. The distal end of the plunger engages a body of the injector. There is also included in the assembly a storage/calibration member which retains the magnetism in the member of the tool and also calibrates it.

8 Claims, 7 Drawing Figures

U.S. Patent  Mar. 12, 1985  4,503,619
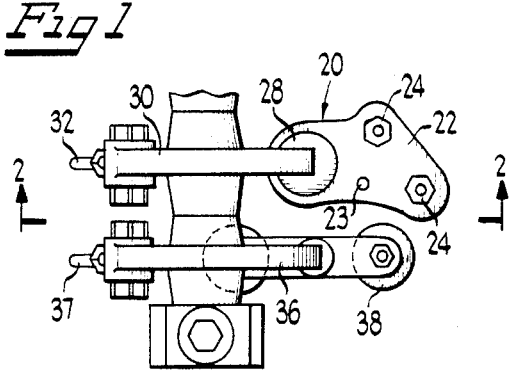
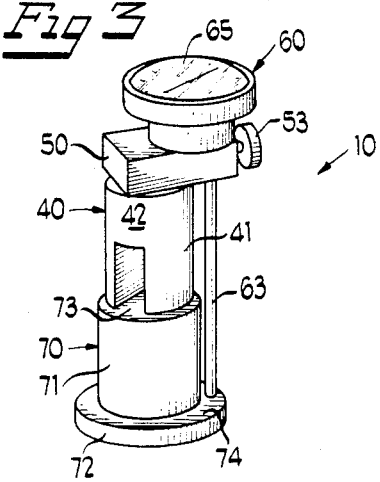
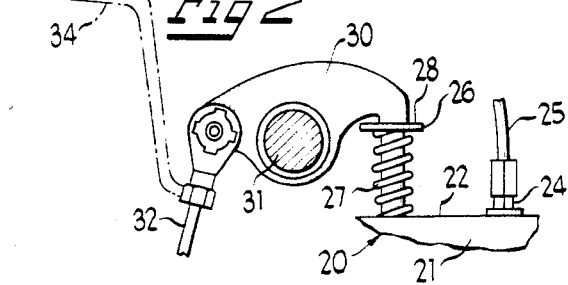
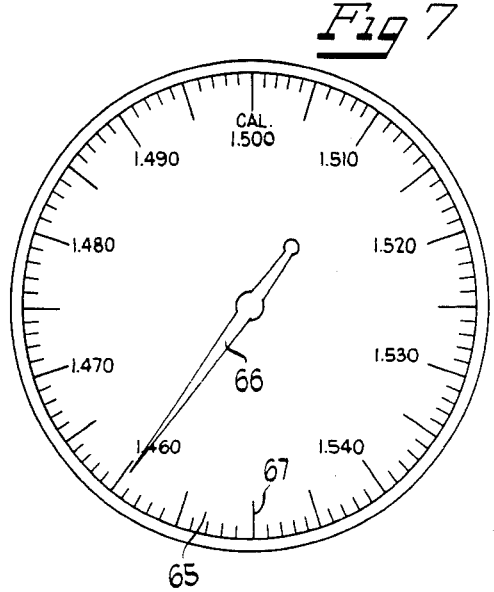
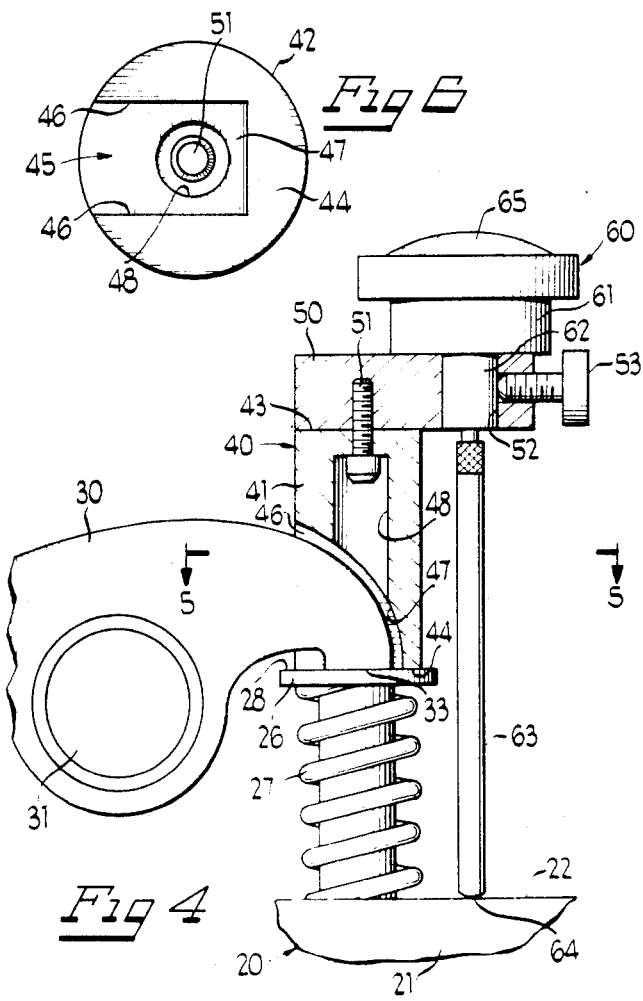

INJECTOR HEIGHT MEASURING TOOL ASSEMBLY

BACKGROUND OF THE INVENTION

This invention relates to devices that measure the injector height in internal combustion engines generally and diesel engines specifically.

An internal combustion engine has a plurality of cylinders. Three rocker arms are provided for each cylinder, one of which operates the fuel injector that delivers fuel into the cylinder and the other two of which operate the exhaust valves that exhaust gas from the cylinder. Each set of three rocker arms pivots on a shaft. The rocker arm that operates the fuel injector has one end connected by means of a push rod and a cam follower to the cam shaft. As the cam shaft rotates, the rocker arm is caused to pivot about its shaft. The other end of the rocker arm engages the follower of the associated fuel injector. The fuel injector meters and injects the amount of fuel required to handle the load, atomizes the fuel for mixing with the air in the combustion chamber and performs other related functions. The follower of the fuel injector is spring biased to its closed position and the rocker arm causes the follower to move against such bias.

To time an injector so that the fuel injection occurs at the desired position of the piston within the associated cylinder, the injector follower must be adjusted to a predetermined height in relation to the injector body. This is accomplished in a diesel engine by utilizing a device that measures such height, then loosening a locking nut associated with the push rod and then adjusting the push rod so that the injector follower is at precisely the correct height.

It is common to utilize a pin gauge consisting of a rod passing through a block. The distance between one surface of the block and one end of the rod is known and the injector height is adjusted until it matches such distance. This has not proved to be sufficiently accurate and requires a different gauge with the desired rod length for each engine.

There have been developed gauges incorporating a micrometer dial on which the height can be read to thousandths of an inch. These are more accurate than the pin gauges. One such device currently in the marketplace is sold by Kent-Moore of Roseville, Mich. The tool sold by Kent-Moore is positioned on the injector follower and a plunger thereof engages the injector body. A needle is deflected to a position on the associated dial indicating the height. The Kent-Moore tool is held in place with two legs having cross pins that hook into the coil spring. Each of these legs is spring loaded to hold the tool in place. However, the tool is subject to become dislodged and displaced and even to fall off of the injector follower.

SUMMARY OF THE INVENTION

It is therefore an important object of the present invention to provide an injector height measuring tool that does not become dislodged from the follower during height measurements.

Another object, in connection with the foregoing object, is to construct the tool of magnetic material so that it can be readily applied to and removed from the injector follower, while at the same time providing good retention in use.

Another object, in connection with the foregoing objects, is to provide a storage and calibration member that can be used both to store the tool so that it does not loose its magnetism and also to calibrate the tool.

In summary, there is provided an injector height measuring tool for use with an internal combustion engine including a fuel injector having a follower with a planar follower surface, the fuel injector being carried by a fuel injector body having a planar body surface substantially parallel to and spaced downwardly from the planar follower surface, a pivotally mounted rocker arm having one end engaging the planar follower surface, the injector height measuring tool comprising a generally cylindrical magnetic member having a generally cylindrical side surface and a planar end surface, the member having a slot therein extending from the planar end surface through the cylindrical side surface and having a size slightly greater than that of the rocker arm, a dial micrometer gauge having a housing and an outwardly biased plunger extending therefrom and a dial carried thereby, and means for holding the housing on the member so that the axes of the member and the plunger are laterally spaced apart and substantially parallel to each other, in use the planar end surface magnetically engaging the planar follower surface while the portion of the rocker arm at the end thereof is located in the slot, and the distal end of the plunger engaging the planar body surface, whereby the dial indicates the distance between the planar follower surface and the planar body surface.

A storage/calibration member is used to check and calibrate the dial gauge for accuracy and to maintain the magnetism in the tool member.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts a portion of the diesel engine which is desired to be tested;

FIG. 2 is a view in vertical section taken along the line 2—2 in which a wrench is depicted in phantom to adjust the push rods;

FIG. 3 is a perspective view of the injector height measuring tool assembly incorporating the features of the present invention;

FIG. 4 is a view in vertical section showing the injector height measuring tool in place in the engine;

FIG. 5 is a view in horizontal section taken along the line 5—5 of FIG. 4;

FIG. 6 is a bottom plan view of the magnetic member of the injector height measuring tool; and FIG. 7 is a plan view of the dial forming part of the tool.

DESCRIPTION OF THE PREFERRED EMBODIMENT

FIG. 1 depicts a portion of a diesel engine which is to be tested with an injector height measuring tool assembly 10 incorporating the features of the present invention. The engine includes a fuel injector 20 which delivers fuel into a cylinder (not shown) associated with such injector. The injector 20 includes an injector body 21 which has a planar body surface 22. A hole 23 in the surface 22 is adapted to receive the end of the rod of a pin gauge. Two fuel connections 24 are carried by the body 21 and are connected by fuel lines 25 (FIG. 2) to a source of fuel. The injector body includes a follower 26 which is coupled to a valve (not shown) located within the body 21. When the follower 26 is depressed, the valve is opened to allow fuel to be injected into the cylinder. A spring 27 urges the follower 26 outwardly and the valve to be normally closed. The follower 26 has a planar follower surface 28 that is parallel to and spaced upwardly from the body surface 22.

Associated with the injector 20 is a rocker arm 30 pivotally mounted on a shaft 31. One end of the rocker arm 30 is connected by means of a push rod 32 to a cam follower (not shown) which in turn engages the cam shaft (not shown). As the cam shaft rotates, the push rod 32 moves up and down causing the rocker arm to pivot about the shaft 31. The other end 33 (FIG. 4) of the rocker arm 30 engages the follower surface 28. Accordingly, the movement of the push rod 32 opens and closes the valve in the injector. Referring to FIG. 2, it is important that the distance between the body surface 22 and the follower surface 28 be precisely that specified by the manufacturer of the engine in order for the fuel to be injected at the proper time in the engine cycle. That height is measured and if it is not precisely equal to the specified value, a lock nut (not shown) associated with the push rod 32 is loosened. This allows a wrench 34 applied to the push rod 32 to be rotated in the appropriate direction to lengthen or shorten such push rod and thus pivot the rocker arm 30, to place the surface 28 at the requisite distance from the surface 22.

Although not pertinent to the present invention, there is also depicted in FIG. 1 another rocker arm 36 operated by a push rod 37 which controls the exhaust valve 38 associated with the cylinder. Additionally, another rocker arm, push rod and exhaust valve are located on the other side of the injector assembly.

Referring to FIG. 3, it may be seen that the tool assembly includes two basic elements: an injector height measuring tool 40 and a storage/calibration member 70.

Referring also to FIG. 4, the tool 40 includes a cylindrical magnetic member 41 having a cylindrical side surface 42 and planar end surfaces 43 and 44. In one form of the invention, the member 41 was a casting and the surfaces 43 and 44 were machined parallel within 0.001 inch. The member 41 has a slot 45 therein defined by parallel side surfaces 46 (FIG. 6) and an interior surface 47 having a curvature somewhat matching the curvature of the rocker arm 30, as can be seen in FIG. 4. The distance between the side surfaces 46 is slightly greater than the width of the rocker arm 30. Also the space between the interior surface 47 and the adjacent surface of the rocker arm 30 is as small as possible, accommodating only the requisite manufacturing tolerance. As a result, the area of the surface 44 will be maximized for reasons to be explained.

The member 41 has a stepped bore 48 extending from the surface 43 to the surface 47, such bore being coaxial with the axis of the member 41.

The tool 40 further comprises a holder 50 which is elongated in the embodiment shown and actually is in the form of a parallelepiped. A screw 51 passes through the bore 48 and is threaded into an opening in the holder 50. This permits pivotal movement of the holder 50 with respect to the member 41, as indicated in FIGS. 3 and 5. The holder 50 also includes a hole 52 therein having its axis parallel to the axis of the member 41. Finally, there is provided a headed set screw 53 oriented such that its axis is perpendicular to the axis of the hole 52.

The tool 40 also comprises a gauge 60 which in turn includes a cylindrical housing 61 having a smaller diameter neck 62. Depending from the neck 62 is a plunger 63 biased to its extended position by a spring (not shown) in the housing 61. The distal end 64 of the gauge 60 is slightly rounded. Referring to FIG. 7, the gauge 60 has a dial 65 and a pointer 66, the dial 65 bearing indicia from 1.460 inches to 1.540 inches.

The neck 62 is disposed within the hole 52 and is held secure in nonrotatable fashion by tightening the set screw 53.

In measuring the height of the injector follower, the lock nut associated with the push rod 32 is loosened, the tool 40 is separated from its storage/calibration member 70 and is applied to the injector 20. The member 41 is placed such that the end portion of the rocker arm 30 is located within the slot 45 and the end surface 44 contacts and magnetically engages the planar follower surface 28. At the same time, the distal end 64 of the plunger 63 contacts the planar body surface 22. The pointer 66 rotates to indicate the distance between the surfaces 28 and 22. If the distance is not according to specification, the wrench 34 is employed to change the effective length of the push rod 32 until the height is exactly equal to the specification. By having the side surfaces 46 and the interior surface 47 closely adjacent to the rocker arm 30, the area of the surface 44 is maximized as previously explained. As a result, the area of contact of the tool 40 with the surface 28 is also maximized, thereby giving maximum holding power and minimizing the chances of inadvertent dislodgement of the tool 40 during use.

The tool assembly 10 also comprises a storage/calibration member 70 which in turn includes a cylindrical block 71 and an annular flange 72 of greater diameter, these elements being made of steel. The block 71 and flange 72 have planar surfaces 73 and 74 respectively. When the tool 40 is not in use, it is applied to the storage/calibration member 70, the surface 44 contacting and magnetically engaging the surface 73, and the distal end 64 of the plunger 63 contacting the surface 74. This will enable the member 41 to retain its magnetism. The member 70 also serves the function of calibrating the tool 40. Such calibration may be accomplished in the following manner. First, the set screw 53 is loosened and the gauge 60 removed from the holder 50. The dial 65 is rotated with respect to the housing 61 until the pointer 66 points to the line 67 (mid point of the range). Then the gauge 60 is inserted into the holder 50 so that the distal end 64 is in contact with the surface 74 and the member 41 is on the surface 73. The height of the gauge 60 is adjusted such that the pointer 66 points substantially to the position "CAL. 1.500". Then the set screw 53 is tightened and the dial 65 is rotated until the pointer 66 points precisely to "CAL. 1.500". Of course, in this particular example, the distance between the surfaces 73 and 74 is precisely 1.500 inch. The purpose of the first two steps is to place the pointer 66 substantially in the middle of the range.

What has been described, therefore, is an improved injector height measuring tool assembly including an injector height measuring tool that is magnetically held by the injector follower, and a storage/calibration member which both stores the tool so that it does not lose its magnetism and calibrates it also.

We claim:

1. An injector height measuring tool for use with an internal combustion engine including a fuel injector having a follower with a planar follower surface, the fuel injector being carried by a fuel injector body having a planar body surface substantially parallel to and spaced downwardly from the planar follower surface, and a pivotally mounted rocker arm having one end engaging the planar follower surface, said injector height measuring tool comprising: a generally cylindrical magnetic member having a generally cylindrical side surface and a planar end surface, said member having a slot therein extending from said planar end surface through said cylindrical side surface and having a size slightly greater than that of the rocker arm, the area of said planar end surface being slightly less than that portion of the planar follower surface not engaged by the pivotally mounted rocker arm, a dial micrometer gauge having a housing and an outwardly biased plunger extending therefrom and a dial carried thereby, and means for holding said housing on said member so that the axes of said member and said plunger are laterally spaced apart and substantially parallel to each other, said holding means accommodating pivotal movement of said housing and said plunger about the axis of said member, in use said planar end surface magnetically engaging the planar follower surface while the portion of the rocker arm at the end thereof is located in said slot and said distal end of said plunger engaging the planar body surface, whereby said dial indicates the distance between the planar follower surface and the planar body surface.

2. The injector height measuring tool of claim 1, wherein said member has a further end surface substantially parallel to said first mentioned end surface, said holding means being an elongated member attached to said member at said further end.

3. The injector height measuring tool of claim 2, wherein said elongated member includes a hole therein having an axis parallel to the axis of said member.

4. The injector height measuring tool of claim 2, wherein said member is a parallelepiped.

5. The injector height measuring tool of claim 2, wherein said member is non-magnetic.

6. The injector height measuring tool of claim 1, wherein said slot has a pair of side surfaces substantially parallel to each other and to the axis of said member, said slot having a curved interior surface somewhat matching the curvature of the rocker arm.

7. An injector height measuring assembly for use with an internal combustion engine including a fuel injector having a follower with a planar follower surface, the fuel injector being carried by a fuel injector body having a planar body surface substantially parallel to and spaced downwardly from the planar follower surface, and a pivotally mounted rocker arm having one end engaging the planar follower surface, said injector height measuring tool comprising: a generally cylindrical magnetic member having a generally cylindrical side surface and a planar end surface, said member having a slot therein extending from said planar end surface through said cylindrical side surface and having a size slightly greater than that of the rocker arm, the area of said planar end surface being slightly less than that portion of the planar follower surface not engaged by the pivotally mounted rocker arm, a dial micrometer gauge having a housing and an outwardly biased plunger extending therefrom and a dial carried thereby, means for holding said housing on said member so that the axes of said member and said plunger are laterally spaced apart and substantially parallel to each other, said holding means accommodating pivotal movement of said housing and said plunger about the axis of said member, in use said planar end surface magnetically engaging the planar follower surface while the portion of the rocker arm at the end thereof is located in said slot and said distal end of said plunger engaging the planar body surface, whereby said dial indicates the distance between the planar follower surface and the planar body surface, and a storage and calibration member including a generally cylindrical steel block and an annular flange protruding outwardly around said block, said block having a planar block surface and said flange having a planar flange surface, said tool being applied to said storage and calibration member for storage and for calibration such that the planar end surface engages said planar block surface and the distal end of said plunger engages said planar flange surface.

8. The injector height measuring assembly of claim 7, wherein the distance between said planar block surface and said planar flange surface is 1.500 inch.

* * * * *